Jan. 4, 1944.  O. N. GREDELL  2,338,686
CONNECTION FOR THIN WALL TUBING
Filed March 19, 1942  2 Sheets-Sheet 1

INVENTOR
Otto N. Gredell.
BY
ATTORNEY

Jan. 4, 1944.   O. N. GREDELL   2,338,686
CONNECTION FOR THIN WALL TUBING
Filed March 19, 1942   2 Sheets-Sheet 2
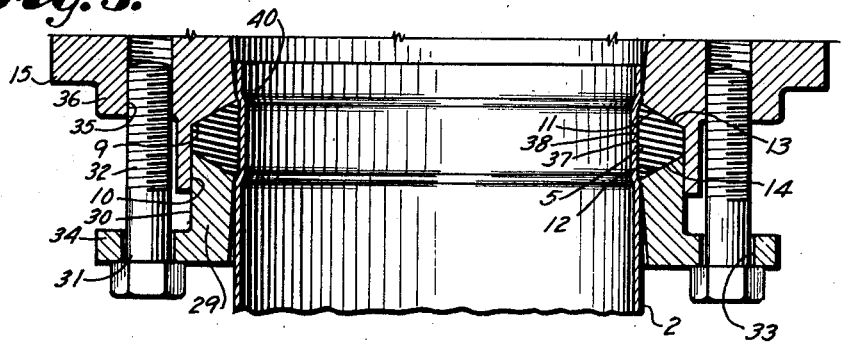
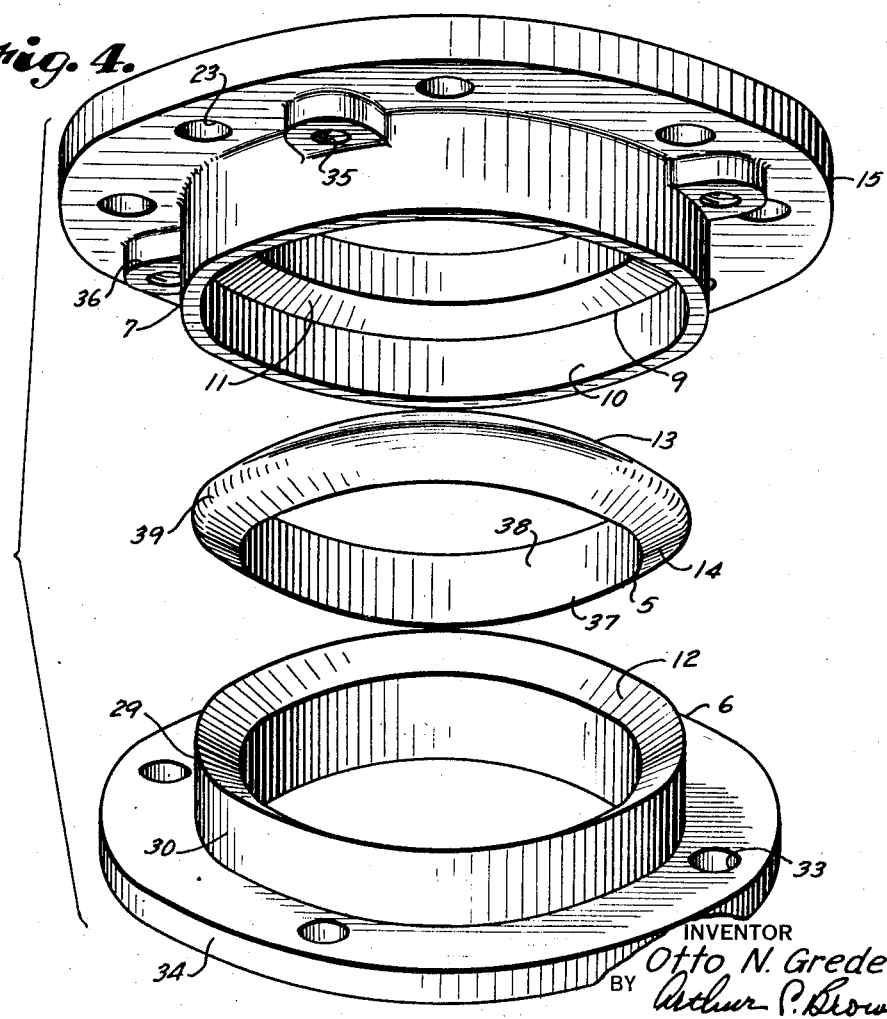
INVENTOR
Otto N. Gredell.
BY
ATTORNEY Patented Jan. 4, 1944

2,338,686

UNITED STATES PATENT OFFICE 2,338,686

CONNECTION FOR THIN WALL TUBING

Otto N. Gredell, Kansas City, Mo., assignor to Standard Steel Works, North Kansas City, Mo., a corporation of Missouri Application March 19, 1942, Serial No. 435,261

4 Claims. (Cl. 285—34)

This invention relates to a connection for thin wall tubing of relatively large diameters, such as desirable in the piping of truck tanks and particularly those used in transporting fuels for military uses.

Such tanks must be extremely mobile and capable of hauling maximum live loads with a given horsepower. It is also important that the piping thereof be of large flow capacity in order that the tanks may be quickly filled and emptied of their contents. These requirements necessitate use of relatively thin, light weight materials and relatively large diameter thin wall tubing. However, it has been difficult to provide adequate connections for such tubing since threading, welding, and the like are not practical for thin wall tubing.

It is, therefore, the purpose of the present invention to provide an adequate connection for thin wall tubing whereby it may be readily interconnected or attached to light weight structures, for example tanks, to withstand the rigorous service without leaking.

Other objects of the invention are to provide a tubing connection of light weight in keeping with the light weight tank construction; to provide a tubing connection that rigidly supports the tubing in an adjusted position; to provide a tubing connection employing a resilient gripping member constructed to enhance the gripping action in case the transported liquid tends to leak therethrough; to provide a tubing connection with an attaching flange formed as a part of one of the gripping members which effect engagement of the gripping element with the tubing; and to provide a tubing connection with means for drawing the gripping element engaging members together separate from the means which attach the flange to the wall of a tank or similar vessel.

In accomplishing these and other objects of the invention, I have provided improved structure, the preferred forms of which are illustrated in the accompanying drawings, wherein:

Fig. 1 is a cross-section through a portion of a truck tank illustrating a thin wall tubing connection embodying the features of the present invention, adjustment of the tubing relative to the connection being shown in dotted lines and the section being taken through the fastening members which secure the connection with a wall of a tank or the like.

Fig. 3 is a fragmentary section similar to Fig. 2 but showing the gripping element in engagement with the tubing for retaining the tubing in connected relation with the tank and effecting a seal therewith.

Fig. 4 is a perspective view of the principal parts of the connection shown in disassembled spaced relation to better illustrate the construction thereof.

Figure 1:
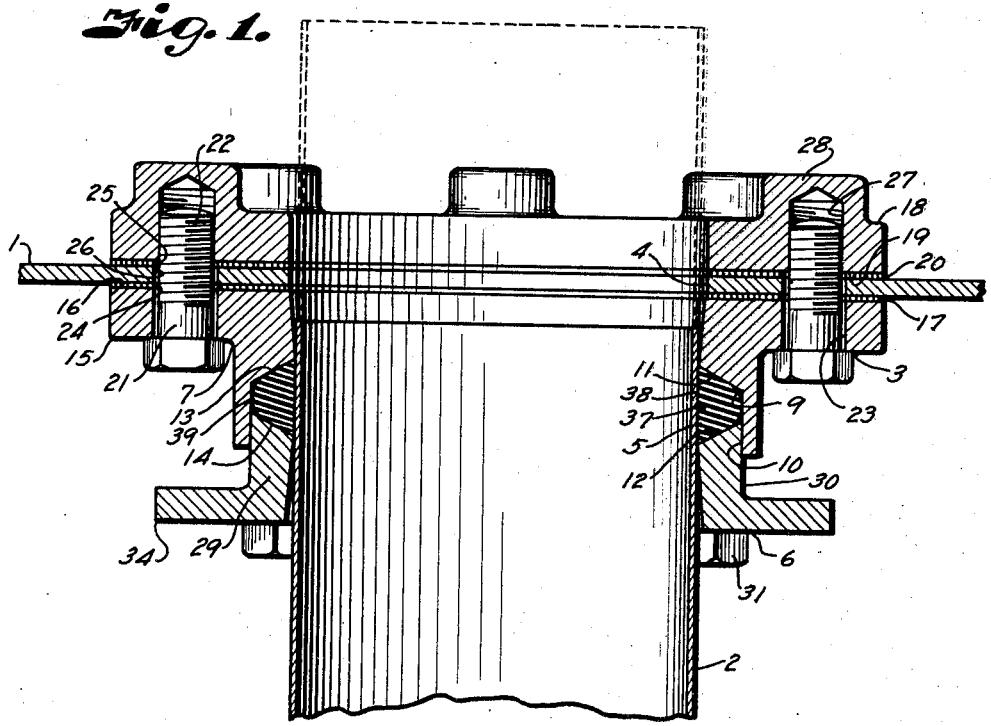
Figure 2:
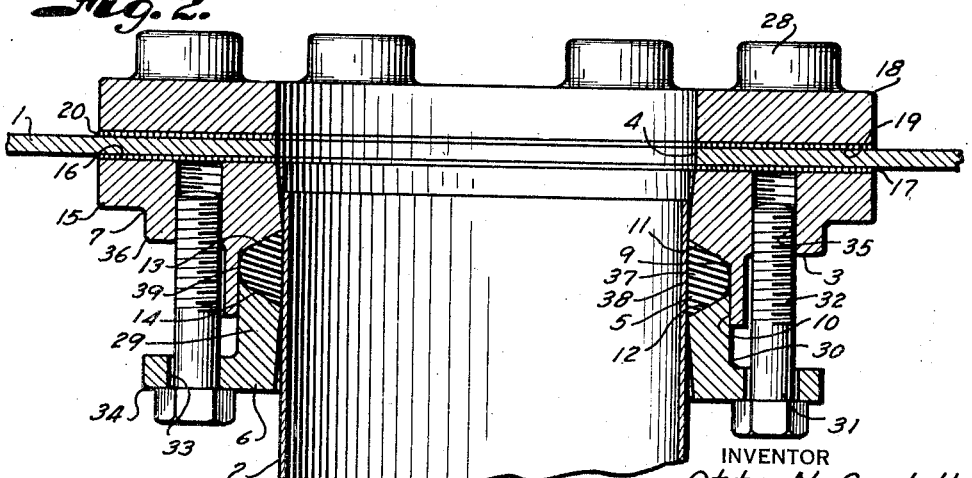
Fig. 2 is a similar cross-section taken through the connection at the point of the fastening devices which draw the tubing embracing rings into position for effecting engagement of the resilient gripping element with the tubing.

Referring more in detail to the drawings:

1 designates a portion of the wall of a vessel such as a truck tank used for hauling petroleum products, for example motor fuel, and 2 designates a relatively large diameter thin wall tubing to be connected therewith by a connection 3 embodying the features of the present invention. The tubing 2 is formed of a substantially rigid material capable of retaining its shape under service, but the diameter and thickness thereof preclude the usual methods of attaching the tubing in registering relation with an opening 4 in the wall of the tank. The connection 3 is, therefore, especially adapted to secure the tubing and prevent leakage therearound. The connection therefore includes a substantially resilient gripping member 5 which is retained in gripping relation with the wall of the tubing by annular clamping members 6 and 7 having inner diameters to freely pass the tubing therethrough, as shown in Fig. 1. If desired, the openings through the members may be slightly tapered to compensate for slight angular adjustment of the tubing relatively to the axis of the opening 4.

The member 7 has a collar portion 8 provided with an internal annular recess 9 including a substantially cylindrical face 10 having its axis coaxial with that of the tubing and spaced from the wall thereof to accommodate the gripping element therebetween. The recess also has a tapering annular shoulder 11 which cooperates with a similar tapering face 12 on the member 6 to engage correspondingly tapered sides 13 and 14 of the gripping element 5. The member 7 has a lateral annular flange 15 provided with a base face 16 corresponding to the shape of the surface of the tank wall surrounding the opening 4 to clamp an annular gasket 17 therebetween.

Cooperating with the flange 15 and located on the inner side of the wall is a ring member 18 having an inner diameter preferably corresponding to that of the opening 4 and an outer diameter conforming to the diameter of the flange 15. The ring 18 also has a face 19 adapted to engage an annular gasket 20 contacting the inner face of the wall to prevent leakage from the interior of the tank when the flange 15 and ring 18 are drawn into contact with the gaskets upon insertion of fastening devices, such as cap-screws 21. The cap-screws have threaded shanks 22 projected through openings 23 in the flange 15, registering openings 24 and 25 in the gaskets, openings 26 in the wall of the tank, and into threaded sockets 27 formed in the ring 18 and extending into bosses 28 that are formed on the opposite face of the ring. The gaskets thus cooperate to form a seal about the fastening devices and prevent leakage of liquid from the tank therethrough.

The member 6 has a cylindrical collar portion 29 having a slightly tapering annular face of such a diameter that the member 6 turns upon the tubing and which has an outer circumferential face 30 slidably engaged within the cylindrical face 10 so that the member 7 is guided and retained in concentric relation therewith upon insertion of draw-bolts 31 that have their shanks 32 extending through openings 33 in a circumferential flange 34 of the member 6 and which are turned into threaded openings 35 formed in the flange of the member 7 at points intermediate the fastening devices 21.

In order to lighten the construction of the member 7 and at the same time provide sufficient threads for the openings 35, the flange at the position of the openings is provided with bosses 36.

The gripping element 5 is best illustrated in Fig. 4 and includes a ring-like body 37 having a substantially cylindrical inner gripping face 38 conforming to the outer circumference of the tubing and having the tapering and outwardly converging sides 13 and 14 previously mentioned. The outer circumference of the gripping member is preferably rounded, as at 39, and merges into the sides 13 and 14 thereof. The gripping member is formed of a substantially resilient material capable of being deformed by pressure and returned to its original shape when the pressure is released so that when the members 6 and 7 are drawn together the pressure effected by the tapers 11 and 12 on the sides 13 and 14 causes a portion of the material composing the gripping member to be pressed against the wall of the tubing with sufficient pressure to securely retain the tubing and to effect a leak-proof seal therewith. In some instances it may be desirable to apply sufficient pressure to form an annular groove or depression 40 in the tubing and effect a key whereby the tubing is positively prevented from pulling out of the clamping members. While it is possible to form the gripping member of any suitable material capable of being deformed under pressure, I preferably construct the member of a synthetic rubber of the type obtainable on the market and sold under the trade-names "neoprene," "Thiokol," "Koroseal," "duprene," "Ameripol," etc., as such materials are resistant to petroleum products and particularly gasolines. Such materials also have the characteristic of swelling when contacted with gasolines so that should a leak tend to develop between the gripping member and tubing or the clamping faces of the members 6 and 7, the gripping member will expand sufficiently to effect automatic closure of the space and maintain an effective seal about the tubing. A material of this character also provides the necessary frictional pressure when under compression to positively grip the tubing and support it in its desired position relative to the wall or the like to which the tubing is connected.

In applying a connector constructed as described, the ring member 18 with its gasket 20, is applied to the inner face of the tank wall in encircling relation with the opening 4 while the member 7 with its gasket 17 is applied to the outer face of the wall in concentric relation therewith. The fastening devices 21 are then inserted and drawn tight to compress the gaskets and prevent leakage between the faces of the wall and the applied members. The gripping element 5 is then inserted in the annular recess 9 of the member 7, followed by the cylindrical collar 29 of the member 6. The bolts 31 are then applied so that the shanks 32 are partially threaded into the openings 33. The bolts, however, are left sufficiently loose to avoid any distortion of the gripping member 5. The end of the tubing is then inserted through the assembly and adjusted to its desired position by sliding the tubing through the clamping member and connecting the opposite end thereof, for example with a pump inlet. After the tubing has been adjusted to its desired position, the fastening devices 31 are drawn up uniformly tight to effect uniform pressure on the gripping element and deformation of a portion thereof against the outer circumference of the tubing to grip the tubing firmly and prevent displacement thereof, at the same time providing a leak-tight joint therearound. If desired, sufficient pressure may be applied through the bolts 31 to effect an annular depression 40 in the tubing as shown in Fig. 3 for enhancing the gripping action of the connector.

From the foregoing it is obvious that I have provided a connector especially adapted for securing thin wall tubing to truck tanks and like structures where weight is a factor and in which relatively large diametered thin wall tubing must be securely anchored to prevent leakage.

What I claim and desire to secure by Letters Patent is:

1. A device for connecting thin wall tubing centrally of an opening in a light gauge wall including a pair of members encircling the tubing and having interfitting portions forming a closed annular recess about the tubing, a solid bodied gripping element in said recess and having a gripping face portion contacting the tubing, draw bolts for drawing said members together to effect displacement of the gripping face of said element into gripping contact with the tubing, an annular flange on one of the members positioned on one side of said wall in encircling relation with said opening, a ring member on the opposite side of said wall, a gasket between the flange and the wall, an annular gasket between the ring and said wall, said flange having openings registering with openings in said wall and said ring having threaded sockets registering with said openings and provided with closed bottoms, and cap screws extending through said openings and engaging in the sockets of the ring to secure said members to the wall.

2. A device for connecting thin wall tubing to a structure with which the tubing communicates including, a pair of members having tapered openings for passing the tubing therethrough and having interfitting portions, one axially slidable relative to the other and cooperating to form a closed annular recess about the tubing, the taper of said openings extending inwardly in the direction of said recess whereby the tubing is closely engaged by said members at the sides of the recess but is free for limited angular adjustment in said members, a solid bodied resilient gripping element in said recess having a gripping face portion contacting the tubing about the circumference thereof, means connecting said members to effect said axial movement for drawing said interfitting portions into pressing contact with said resilient gripping element to effect uniform pressure of said gripping face against the tubing to anchor the tubing relative to said members, and an annular flange on one of the members having openings for fastening devices to secure the flange to said structure.

3. A device for connecting thin wall tubing to a light gauge wall having an opening of a diameter to permit reception of the tubing in the opening, including a pair of members encircling the tubing and having interfitting portions forming a closed annular recess about the tubing, a solid bodied resilient gripping element in said recess and having a gripping face portion contacting the tubing, draw bolts for drawing said members together to effect displacement of the gripping face of said element into gripping contact with the tubing, an annular flange on one of the members positioned on one side of the wall in encircling relation with said opening of the wall, a ring member on the opposite side of the wall having an inner diameter to permit passage of the tubing therethrough, a gasket between the flange and the wall, an annular gasket between the ring and said wall, said flange having openings registering with openings in said wall and said ring having threaded sockets registering with said openings and provided with closed bottoms, and cap screws extending through openings and engaging in the sockets of the ring to secure said members to the wall.

4. A device for connecting thin wall tubing to a light gauge wall having an opening for freely passing the tubing, including a pair of members having tapered openings for passing the tubing therethrough and having interfitting portions, one axially slidable relative to the other and cooperating to form a closed annular recess about the tubing, the taper of said opening extending inwardly in the direction of said recess whereby the tubing is closely engaged by said members at the sides of the recess but is free for limited angular adjustment in said members, a solid bodied resilient gripping element in said recess having a gripping face portion contacting the tubing about the circumference thereof, means connecting said members to effect said axial movement for drawing said interfitting portions into pressing contact with said resilient element to effect uniform pressure of said gripping face against the tubing to anchor the tubing relative to said members, and an annular flange on one of the members having openings for fastening devices to secure the flange to said wall in encircling relation to the opening in said wall.

OTTO N. GREDELL.